US006070455A

United States Patent [19]
Cavestri

[11] Patent Number: 6,070,455
[45] Date of Patent: Jun. 6, 2000

[54] LEAK DETECTION ADDITIVES

[75] Inventor: Richard C. Cavestri, Columbus, Ohio

[73] Assignee: Bright Solutions, Inc., Troy, Mich.

[21] Appl. No.: 09/019,340

[22] Filed: Feb. 5, 1998

Related U.S. Application Data

[63] Continuation-in-part of application No. 08/824,263, Mar. 28, 1997, which is a continuation of application No. 08/700,055, Aug. 20, 1996, abandoned, which is a continuation of application No. 08/505,764, Jul. 21, 1995, abandoned.

[51] Int. Cl.$^7$ .............................. G01M 3/20; G01H 3/20
[52] U.S. Cl. .................................. 73/40.7; 8/526; 8/528; 62/125; 252/68; 252/964
[58] Field of Search ..................... 73/40.7; 8/526–528, 8/617; 62/77, 125; 252/68, 301.16, 964

[56] References Cited

U.S. PATENT DOCUMENTS

| | | |
|---|---|---|
| 1,279,679 | 9/1918 | Fear . |
| 1,800,693 | 4/1931 | Major . |
| 1,915,965 | 6/1933 | Williams . |
| 1,935,901 | 11/1933 | Augenblick ..................... 8/6 |
| 2,096,099 | 10/1937 | Gaugler . |
| 2,260,608 | 10/1941 | Cormack . |
| 2,341,430 | 2/1944 | Elsey . |
| 2,428,426 | 10/1947 | Lindsay . |
| 2,506,806 | 5/1950 | Metzger . |
| 2,526,938 | 9/1950 | Davis et al. . |
| 2,579,053 | 12/1951 | Schulstadt . |
| 2,682,857 | 7/1954 | Reissmann . |
| 2,757,632 | 8/1956 | Wittlin . |
| 2,918,033 | 12/1959 | Snyder . |
| 2,918,893 | 12/1959 | Norton . |
| 2,994,295 | 8/1961 | Newcum . |
| 3,006,861 | 10/1961 | Browning et al. . |
| 3,027,754 | 4/1962 | Alquist et al. ................... 73/40.7 |
| 3,118,463 | 1/1964 | Lacart . |
| 3,121,615 | 2/1964 | Price . |
| 3,225,554 | 12/1965 | Alexander . |
| 3,234,045 | 2/1966 | Larsen . |
| 3,323,350 | 6/1967 | Roberts . |
| 3,361,547 | 1/1968 | Packo . |
| 3,370,013 | 2/1968 | Labac . |
| 3,476,500 | 11/1969 | Litke ............................. 8/93 |
| 3,572,085 | 3/1971 | Packo . |
| 3,770,640 | 11/1973 | Bartlett ........................ 252/68 |
| 3,774,022 | 11/1973 | Dubrow et al. . |
| 3,785,164 | 1/1974 | Wrenn, Jr. . |
| 3,838,578 | 10/1974 | Sakasegawa et al. . |
| 3,876,378 | 4/1975 | Montagnon . |
| 3,898,172 | 8/1975 | Reif et al. . |
| 3,960,001 | 6/1976 | Hayes . |
| 4,046,507 | 9/1977 | Zweifel et al. . |
| 4,072,615 | 2/1978 | McConnell . |
| 4,109,487 | 8/1978 | Carr . |
| 4,120,780 | 10/1978 | Morimoto et al. ............. 208/211 |
| 4,170,564 | 10/1979 | Brendle . |
| 4,176,205 | 11/1979 | Molina . |
| 4,187,798 | 2/1980 | Yoshimura . |
| 4,249,412 | 2/1981 | Townsend, III . |
| 4,272,264 | 6/1981 | Cullen et al. . |
| 4,288,402 | 9/1981 | Ellis . |
| 4,348,235 | 9/1982 | Lasswell et al. . |
| 4,369,120 | 1/1983 | Stelz et al. ................... 252/68 |
| 4,382,679 | 5/1983 | Lee . |
| 4,436,641 | 3/1984 | Stelz et al. ................... 252/68 |
| 4,487,707 | 12/1984 | Holzknecht . |
| 4,513,578 | 4/1985 | Proctor et al. . |
| 4,612,798 | 9/1986 | Roberts . |
| 4,662,940 | 5/1987 | Monier . |
| 4,688,388 | 8/1987 | Lower et al. . |
| 4,690,689 | 9/1987 | Malcosky et al. . |
| 4,693,118 | 9/1987 | Roberts . |
| 4,745,772 | 5/1988 | Ferris . |
| 4,758,366 | 7/1988 | Parekh . |
| 4,784,959 | 11/1988 | Wegrzyn . |
| 4,822,743 | 4/1989 | Wegrzyn . |
| 4,862,698 | 9/1989 | Morgan et al. . |
| 4,897,551 | 1/1990 | Gersh et al. . |
| 4,909,806 | 3/1990 | Garbe . |
| 4,938,031 | 7/1990 | Manz et al. . |
| 4,938,063 | 7/1990 | Leighley . |
| 5,022,902 | 6/1991 | Juhl et al. . |
| 5,071,993 | 12/1991 | Leppard et al. . |
| 5,132,260 | 7/1992 | Plee ............................. 502/64 |
| 5,152,926 | 10/1992 | Brown . |
| 5,167,140 | 12/1992 | Cooper et al. . |
| 5,167,867 | 12/1992 | Quaife et al. . |
| 5,251,453 | 10/1993 | Stanke et al. . |
| 5,272,882 | 12/1993 | Degier et al. . |
| 5,301,537 | 4/1994 | Atkinson . |
| 5,357,782 | 10/1994 | Henry ........................ 73/40.7 |
| 5,396,774 | 3/1995 | Hubbell, Jr. . |
| 5,421,192 | 6/1995 | Henry ........................ 73/40.7 |
| 5,440,919 | 8/1995 | Cooper ....................... 73/40.7 |
| 5,558,808 | 9/1996 | Smith et al. . |
| 5,560,855 | 10/1996 | Hinton et al. ............... 252/68 |
| 5,650,563 | 7/1997 | Cooper et al. ............... 73/40.7 |
| 5,681,984 | 10/1997 | Cavestri . |

FOREIGN PATENT DOCUMENTS 1199675 7/1970 United Kingdom .

OTHER PUBLICATIONS

Davis, "Don't Lose Your Cool Over Refrigerant Leaks", Air Conditioning, Heating & Refrigeration News, May 2, 1994, pp. 10–11.

Davis, "Pinpointing HFC–134a Leaks is Easy if You Use the Proper Equipment", Air Conditioning, Heater & Refrigeration News, Dec. 7, 1992, pp. 36–37.

Davis, "Pinpointing Vehicle Leaks Faster with Ultraviolet Light", Materials Evaluation, vol. 47, Nov. 1989, pp. 1248–1250.

Marrano, "Fluorescent Tracer Additives as a Nondestructive Inspection Technique for Leak Testing", Materials Evaluation, vol. 51, No. 4, Apr. 1993, pp. 436–438.

The Spectroline, vol. 1, No. 1, HVAC Edition, Spring 1991.

Primary Examiner—Daniel S. Larkin
Attorney, Agent, or Firm—Fish & Richardson P.C.

[57] ABSTRACT

A dye-delivery structure for introducing a leak detection dye into a climate control system is described. The dye-delivery structure is formed by compression or molding a leak detection dye and a binding agent into a dye-delivery structure such as a tablet, sphere, pellet, or disk, which can be inserted into appropriate locations within the system.

45 Claims, 11 Drawing Sheets

LEAK DETECTION ADDITIVES

CROSS-REFERENCE TO RELATED APPLICATIONS

This is a continuation-in-part of copending U.S. Ser. No. 08/824,263, filed Mar. 28, 1997, which is a continuation of U.S. Ser. No. 08/700,055, filed Aug. 20, 1996, now abandoned, which is a continuation of U.S. Ser. No. 08/505,764, filed Jul. 21, 1995, now abandoned, incorporated herein by reference.

BACKGROUND OF THE INVENTION

The invention relates to a dye-delivery structure for introducing a leak detection dye into a climate control system.

Leak detection methods have been developed to analyze fluid systems, such as climate control systems such as heating, cooling, ventilating, and air conditioning systems, hydraulics, engine oil systems, automatic transmission systems, fuel systems, brake systems, or radiator coolant systems, using dyes. Some methods operate by adding emissive substances, such as, for example, fluorescent or phosphorescent dyes to the refrigerants and/or lubricants of a climate control system. Suitable leak detection dyes include naphthalimide, perylene, thioxanthane, coumarin, or fluorescein, and derivatives thereof. Leaks can be detected by observing fluorescence of the dye at leak sites resulting from excitation of the dye with a light source having particular illumination characteristics, such as illumination wavelength or intensity. Suitable light sources for use in fluorescence detection emit light of wavelengths suitable to excite the dye and cause light emission from the dye, which is at a greater wavelength than excitation wavelength. In general, the dyes fluoresce brightly when excited by light in the 190 to 700 nanometer wavelength range.

A variety of systems have been developed to introduce a leak detection dye into air conditioning systems. For example, previous injector designs include flow-chamber systems and syringe-type (e.g., caulking gun-type) systems. A flow-chamber system generally has a reservoir into which a leak detection dye solution is poured or a dye capsule is loaded and sealed. A carrier is then passed through the reservoir to transport the dye into the system. A syringe-type system generally has a chamber that is loaded by pouring the leak detection dye into the chamber or is preloaded by the manufacturer. The dye is then forced from the chamber into the closed system. Other injector systems include mist diffusers. Another example of a method for introducing a leak detection dye into an air conditioning system includes placing the dye into a dehydrator of the system.

SUMMARY OF THE INVENTION

In general, the invention features a dye-delivery structure for introducing a leak detection dye into a climate control system. The dye-delivery structure is inserted into a climate control system or a system component during assembly of the system.

In one aspect, the invention features a dye-delivery structure including a solid leak detection dye and a binding agent. The dye is mixed with a binding agent and formed into the dye-delivery structure. Forming of the structure can include compacting or extruding the mixture. The structure is compacted sufficiently to avoid breakage and dust formation during handling while maintaining good dissolution properties for release into the system. The structure can be solid or semi-solid. A semi-solid structure is a deformable structure, such as a paste or gel.

In another aspect, the invention features a dye-delivery structure including at least 90 weight percent of a leak detection dye and a binding agent, preferably greater than 95 weight percent. The leak detection dye and the binding agent are soluble in a refrigerant, a system lubricant, or a refrigerant-system lubricant mixture.

In another aspect, the invention features a method of manufacturing a dye-delivery structure. The method includes combining a powdered leak detection dye and a binding agent to form a mixture, and pressing the mixture to form a dye-delivery structure. Pressing can include compacting or extruding the mixture.

The binding agent is a substance that aids cohesiveness, for example, by improving the structural integrity of the structure. The binding agent can also aid in dissolution of the dye.

The binding agent can include a fatty acid, a fatty alcohol, a fatty acid ester, a resin, or a polyol ester. Suitable binding agents include stearic acid, methyl stearate, coconut oil, tricaprin, hydrenol, Lorol(C16), Lorol(C18), cocoa butter, methyl laurate, methyl myristate, coconut fatty acid, or methyl coconate. The structure can include less than 10 weight percent of the binding agent, preferably less than 5 weight percent. The structure can include a lubricant. In certain embodiments, the structure can include a silicone, a phosphate ester, or a lubricant additive.

In certain embodiments, the dye-delivery structure consists essentially of a leak detection dye and a binding agent. In other embodiments, the dye-delivery structure consists essentially of a leak detection dye, a binding agent, and a lubricant. In other preferred embodiments, the dye-delivery structure includes at least 95 weight percent of a solid leak detection dye that is soluble in a refrigerant.

The dye-delivery structure can be formed into shapes such as tablets, briquettes, spheres, discs, beads, pellets, cylinders, or other unitary structures. Pellets or cylinders can be formed by extrusion or compaction. Beads can be formed by tumbling or rolling to form the powder into a spherical shape. The beads can be of a size that facilitates dispersion into the refrigerant, system lubricant, or refrigerant-system lubricant mixture. The structure can have enhanced surfaces consisting of grooves, openings, and other features that facilitate maximum flow through, around or over the structure when placed within the system.

In another aspect, the invention features a method of introducing a leak detection dye into a climate control system such as a heating, ventilating, refrigeration, or air conditioning system. The air conditioning system can be an automotive, portable, residential, or commercial air conditioning system. A dye-delivery structure, including the leak detection dye and binding agent, is placed into the system or a component of the system.

The system includes a refrigerant. The refrigerant can include chlorofluorocarbons, hydrochlorofluorocarbons, hydrofluorocarbons, carbon dioxide, ammonia, halogenated or ether derivatives of methane or ethane, or halogenated ether or cyclic derivatives of propane, butane, pentane, or other hydrocarbons. The system can also include a system lubricant.

The leak detection dye can include a naphthalimide dye, a perylene dye, a coumarin dye, a thioxanthane dye, or a derivative thereof. The leak detection dye is soluble in the refrigerant. Some of the dyes are available in both liquid and powder form. The liquid dye can consist of a mixture of the dye with a solvent or a lubricant. The liquid dye can be mixed with a binding agent of sufficiently high viscosity, or of a thixotropic nature, to form a paste. The solid powder dye can be mixed with a binding agent to form a paste or mixed with a binding agent and compressed to form a dye-delivery structure.

The dye-delivery structures can be included in a climate control system or a component of a climate control system. The structure can be placed in a portion of a component. In an air conditioning system, the component can be a receiver drier, a filter drier, an accumulator, a compressor, a condenser, a high pressure discharge line, a discharge muffler, an expansion device (e.g., an expansion valve or orifice tube), a low pressure suction line, a suction muffler, or an evaporator. When an accumulator and received dryer are not present in the system, the component can be a filter assembly. The structure can be place in a system in locations that do not require immobilization of the structure. Preferably, the dye-delivery structure is included in a non-dehydrator portion of the climate control system where enhanced dissolution can occur.

Insertion location, tablet properties, and dye properties can be selected to improve cost, ease of insertion, cleanliness of handling, capital equipment costs, material waste, environmental impact, shelf life prior to insertion in the system, and chemical life once introduced into the system.

The dye-delivery structure is easy to handle and use. The dye-delivery structure can reduce the risk of contaminating the work environment with the dye, which can lead to erroneous leak detection. In addition, the structure dissolves completely in the refrigerant, so that volume in the system is not permanently given up. Moreover, the fixed size of the structure can allow a more precise amount of leak detection dye to be introduced into the system. The dye-delivery structure is essentially solvent-free and is free of impurities that can damage a climate control system.

Introducing a leak detection dye as a dye-delivery structure during the assembly of the climate control system, can enable the system to be tested for leaks to provide a quality assurance tool prior to shipment of the system. It can also facilitate checking the system for leaks at a later time in the field without charging the system with additional leak detection dye. The dye-delivery structure can provide a simple way to insert dyes into, for example, an air conditioning system rapidly and cleanly, without needing to charge the system with refrigerant at the time of dye insertion. Installation during assembly also allows manufacturers to test products on site, permitting the rapid identification of leaks.

Additional features and advantages of the invention will become apparent from the detailed description of the preferred embodiments of the invention.

DESCRIPTION OF THE PREFERRED EMBODIMENTS

Figure 1:
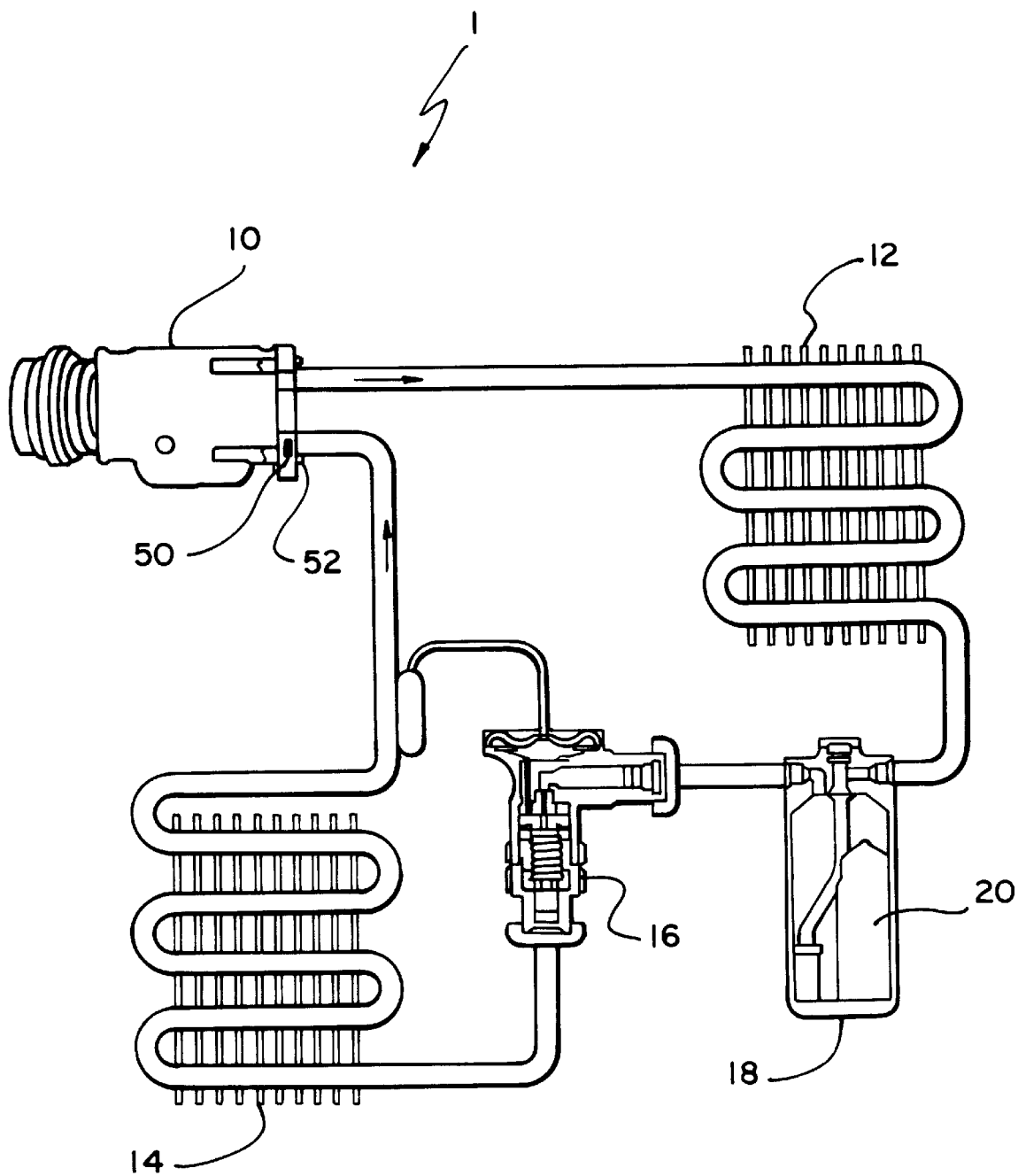
FIG. 1 is a drawing depicting an air conditioning system having a dye-delivery structure in an inlet to a compressor.

A dye-delivery structure includes a leak detection dye and a binding agent. Several techniques are available for preparing the dye-delivery structure. The structure can be prepared by methods described in "Remington's Pharmaceutical Sciences," 14th Edition, Mack Publishing Co., 1970, which is incorporated herein by reference.

In general, a mixture is formulated by mixing a powder of the dye, if necessary, with a suitable binding agent. In general, thorough mixing via grinding, milling, or other granulation methods provides mixtures that can be molded or compacted into well-formed structures. After mixing, the mixture is formed into the dye-delivery structure by extrusion, compaction, molding, heating, or cooling. The mixture can be compacted by supplying pressure using mechanical press or manual means. The resulting structure can take the form of a tablet, a briquette, a sphere, a disc, a bead, a pellet, or a cylinder. The dye-delivery structure can be formed with maximum surface area to assist in dissolution by providing enhanced or embossed surfaces or structures with one or more holes or openings therethrough.

A variety of binding agents can be used in the formulation of the dye-delivery structure. The structure contains between 0 and 10 weight percent binding agent, preferably between about 0.1 and about 5 weight percent, and more preferably between 2 and 4 weight percent. In addition to the binding agent, a lubricant can be added to the formulation. The structure contains between 0 and 2 weight percent of the lubricant. Furthermore, small amounts of a silicone, a phosphate ester, or a lubricant additive, for example about 1 to 2 ppm or about 0.5 weight percent, can be added to the formulation. The silicone, phosphate ester, or lubricant additive can have a viscosity between about 20 and 3200 centistokes.

Suitable binding agents are soluble in a refrigerant of an air conditioning system. Since typical air conditioning systems are anhydrous, the preferred binding agent is an organic compound. The binding agent is compatible with the components of the air conditioning system and does not react adversely with the refrigerant or system lubricants. The solubility and compatibility of the binding agent with the components of the air conditioning system can lead to rapid dissolution properties of the structure.

The binding agent can include a fatty acid, a fatty alcohol, a fatty acid ester, a resin composition, a polyol ester, a polyalkylene glycol, or a hydrocarbon, or mixtures thereof. The resin composition can include beeswax, carnauba wax, an automotive polishing wax, floor polish, or a polyethylene glycol. The polyol ester can be a pentaerythritol ester, a trimethanol propane ester, a triglyceride, diglyceride, or a complex polyol ester. The fatty acid, fatty alcohol, fatty acid ester, and polyol esters such as triglycerides and diglycerides have saturated or unsaturated $C_4$–$C_{18}$ chains. The esters can be $C_1$–$C_{18}$ alkyl esters.

Suitable binding agents include stearic acid, methyl stearate, coconut oil, tricaprin, hydrenol, Lorol(C16), Lorol (C18), cocoa butter, methyl laurate, methyl myristate, coconut fatty acid, methyl coconate, lauryl alcohol, cetyl alcohol, peanut oil, hydrogenated coconut oil, and hydrogenated peanut oil. Tricaprin is a $C_{12}$ compound. Preferred binding agents include stearic acid, methyl stearate, coconut oil, and coconut fatty acid. A variety of binding agents are available, for example, from Aldrich Chemical Co., Abitec Corporation, Henkel, Universal Preserve-A-Chem. Suitable lubricants include system lubricants, such as polyalkylene glycol or polyol ester lubricants. Suitable lubricants include, for example, Emery 2927a, Mobil Arctic EAL 68, UCON 488, Ford PAG, Chrysler PAG, or any other automotive PAG.

The quality of the dye-delivery structure for use in air conditioning systems can be determined by examining the binding ability of the mixture, flow of the mixture in the press, hardness of the structure, and solubility of the structure. Good binding ability and flow of the mixture leads to the formation of well-formed structures. Also, while hardness is an important feature of the structure, it is also important to maintain good solubility of the structure.

The dye-delivery structure is compacted to a degree sufficient to avoid damage during normal handling and storage and at the same time being of a density sufficient to facilitate dissolution when placed into the system to aid in the detection of leaks. The structures have good mechanical strength, for example, to impact and vibration, are not too brittle, and are capable of rapid dissolution. In general, harder structures have slower dissolution rates. In other words, the pressure applied to form the structure by compaction is selected to increase hardness of the structure, while maintaining good dissolution rates and solubility for the structure.

Hardness of the structure can be determined using Tablet Hardness Tester, Model 900-539-001, available from DT Industries, Stokes Division, Bristol, Pa. The hardness of the structure can be between 2 and 25 kg, preferably between 3 and 15 kg using this test. The hardness of tablets including a naphthalimide leak detection dye, 2–4% of a binding agent, and 0–2% of a lubricant varied between 3.5 kg and 9.5 kg.

Solubility rate of the structure can be determined by a percent solubility test. First, the structure is weighed and placed into a test tube with 25 mL of a solution prepared from 240 g of UCON 488 and 1200 mL of methanol. The tube is then placed onto an oscillating test tube rack and rotated for 2 hours. After two hours, the structure is removed from the oscillating rack and allowed to air dry. The structure was reweighed and the percent solubility was calculated according to the formula:

$$\% \text{ solublity} = (\text{initial weight} - \text{final weight})/\text{initial weight}$$

The percent solubility of the structure, according to the test method, can be greater than 50 percent, preferably greater than 60 percent, more preferably greater than 75 percent, and most preferably greater than 85 percent. The percent solubility of tablets including a naphthalimide leak detection dye, 2–4% of a binding agent, and 0–2% of a lubricant varied between 49 percent and 89 percent, according to the above-described test method.

The dye-delivery structure is placed into an air conditioning system. The structure is placed in a component of an air conditioning system. In some circumstances, some users of the dye-delivery structure can require rapid dissolution of the structure while others can require slower dissolution. The composition and compaction (e.g., density) of the structure can be varied to change the dissolution properties of the structure. For example, if a manufacturer does not wish to find leaks in a factory, then slow dissolution can be preferred to avoid any potential leakage of dye at the factory site. Alternatively, some manufacturers will look for a leak at the factory after running the air conditioning system for approximately 10 minutes, thus requiring rapid dissolution.

The location for placement of the structure can be selected to increase the dissolution rate of the dye-delivery structure. For example, components that have a greater flow of refrigerant, in gas or liquid form, or a greater flow of system lubricant can be selected to provide more rapid dissolution rates. Similarly, components that contain the refrigerant or the system lubricant at higher temperatures can be selected to provide more rapid dissolution rates.

Suitable locations for placement of a dye-delivery structure in an air conditioning system include the non-dehydrator portion of an accumulator (e.g., the filter assembly), the non-dehydrator portion of a receiver dryer (e.g., the filter assembly), the compressor (e.g., the inlet or the outlet), the condenser (e.g., the inlet or the manifold), the high pressure discharge line, the discharge muffler, the orifice tube (e.g., its housing and attachments), or the evaporator (e.g., its inlets). While the structure can be maintained in a location using a screen or cage, the structure need not be immobilized in the system.

Each of the suitable locations can provide a relatively rapid dissolution rate of the dye-delivery structure in comparison to other locations in the system due, in part, to increased flow rates of system refrigerant or system lubricant. These locations can also have higher operating temperatures than other locations, leading to more rapid dissolution of the structure.

Referring to FIGS. 1–11, air conditioning system 1 includes compressor 10, condenser 12, and evaporator 14. Compressor 10 causes the refrigerant to flow through the system and through the components of the system.

Figure 7:
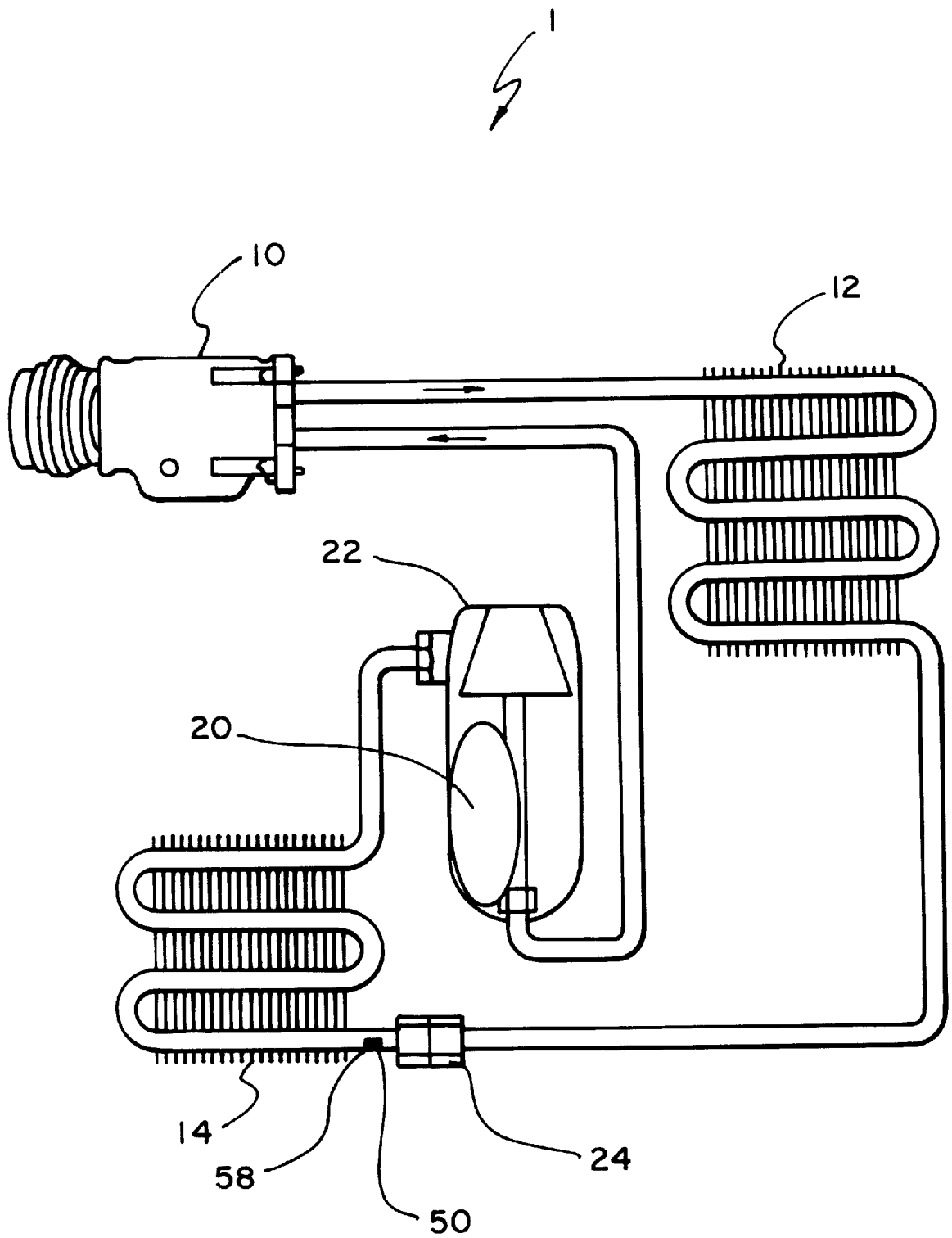
FIG. 7 is a drawing depicting an air conditioning system having a dye-delivery structure in an inlet of an evaporator.
Figure 8:
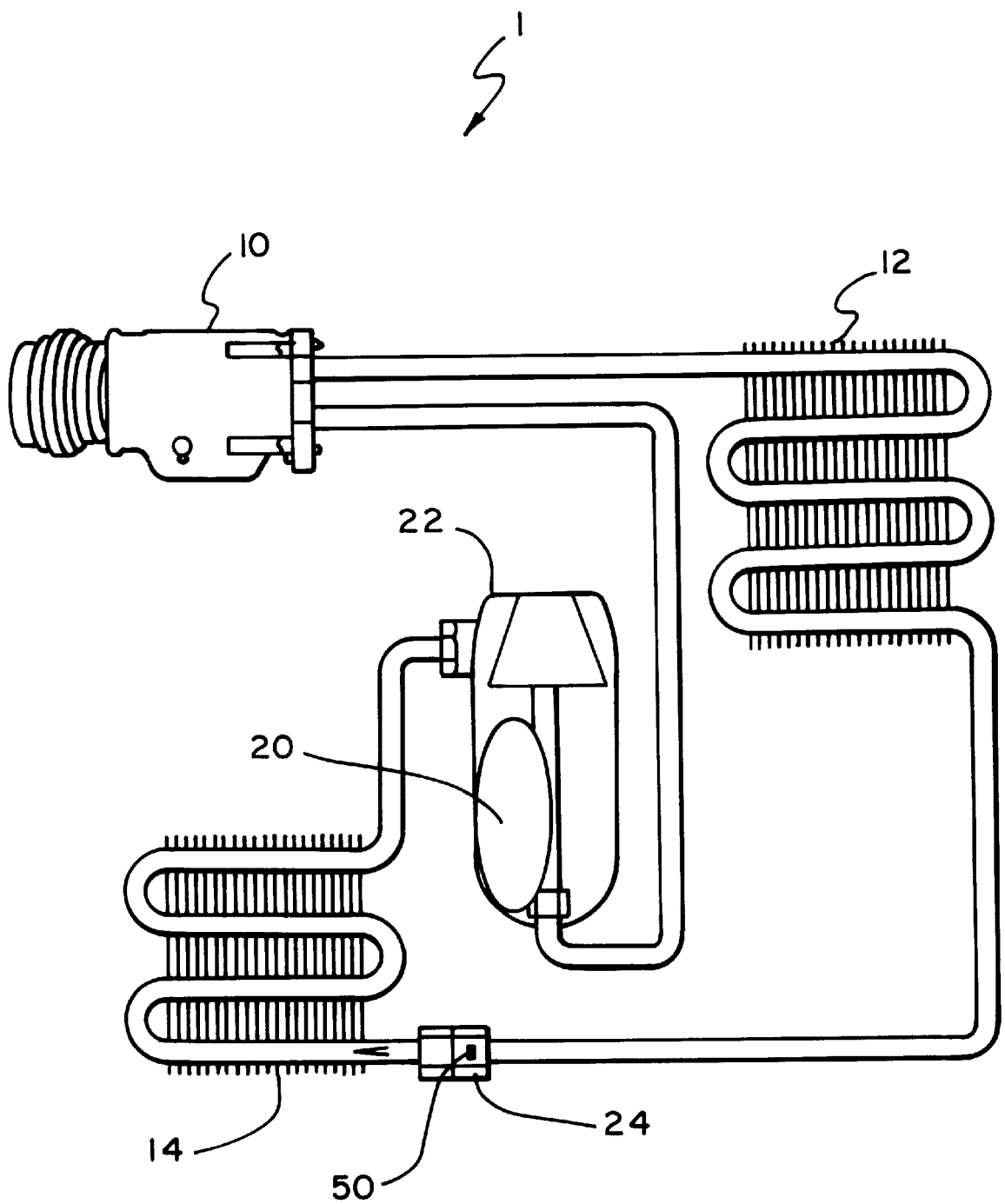
FIG. 8 is a drawing depicting an air conditioning system having a dye-delivery structure in an orifice tube.
Figure 9:
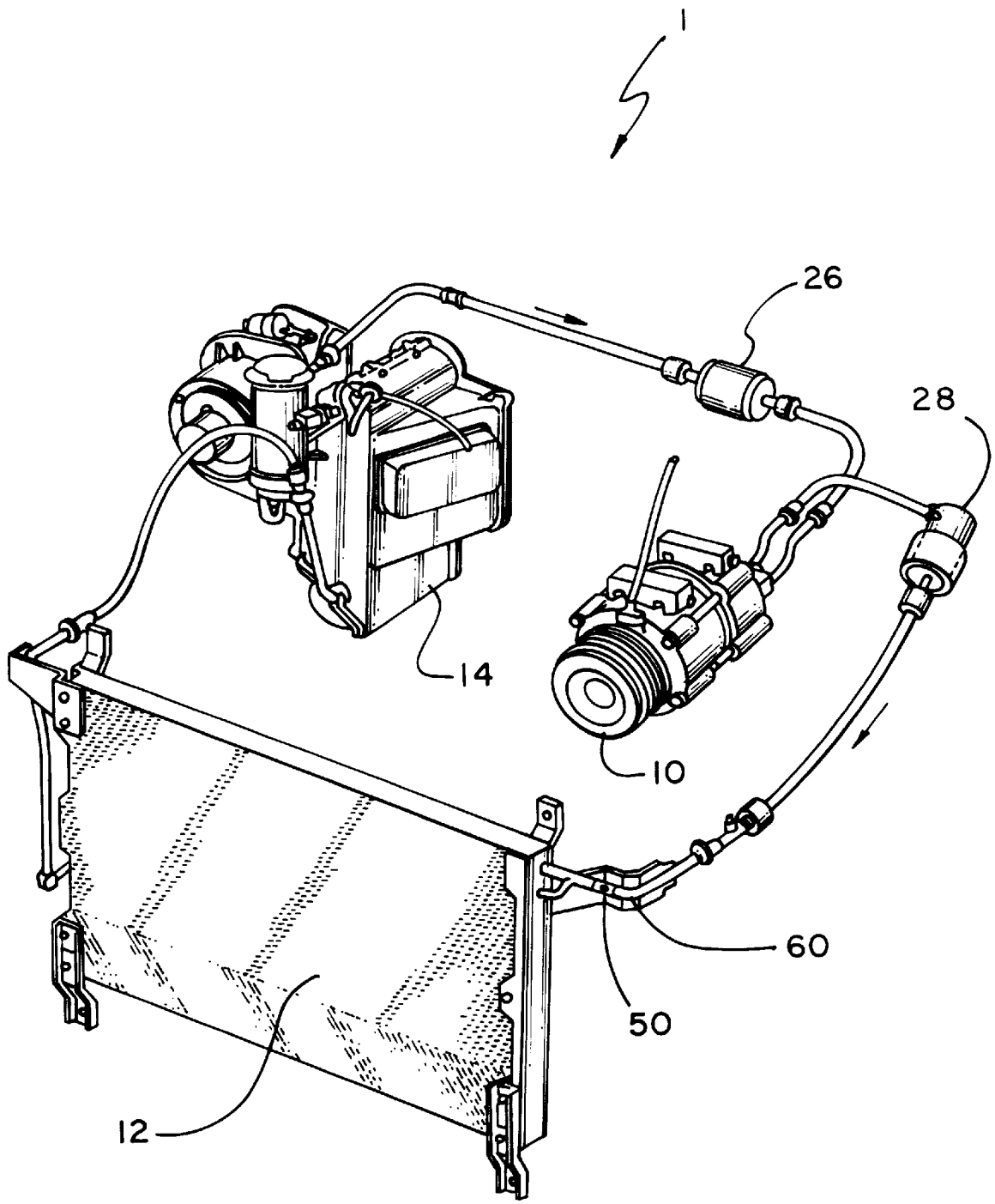
FIG. 9 is a drawing depicting an air conditioning system having a dye-delivery structure in a condenser.
Figure 10:
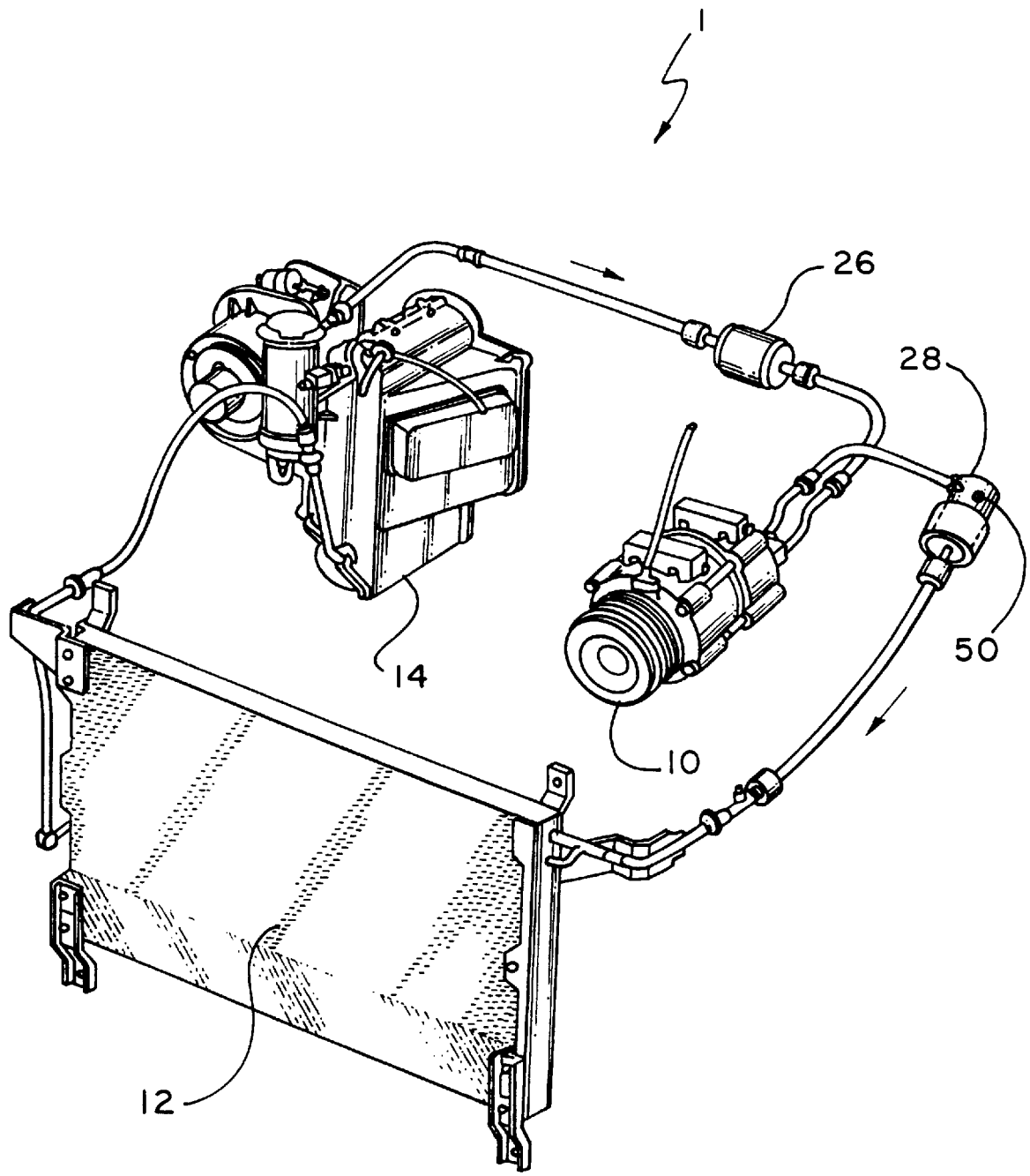
FIG. 10 is a drawing depicting an air conditioning system having a dye-delivery structure in a discharge muffler.
Figure 11:
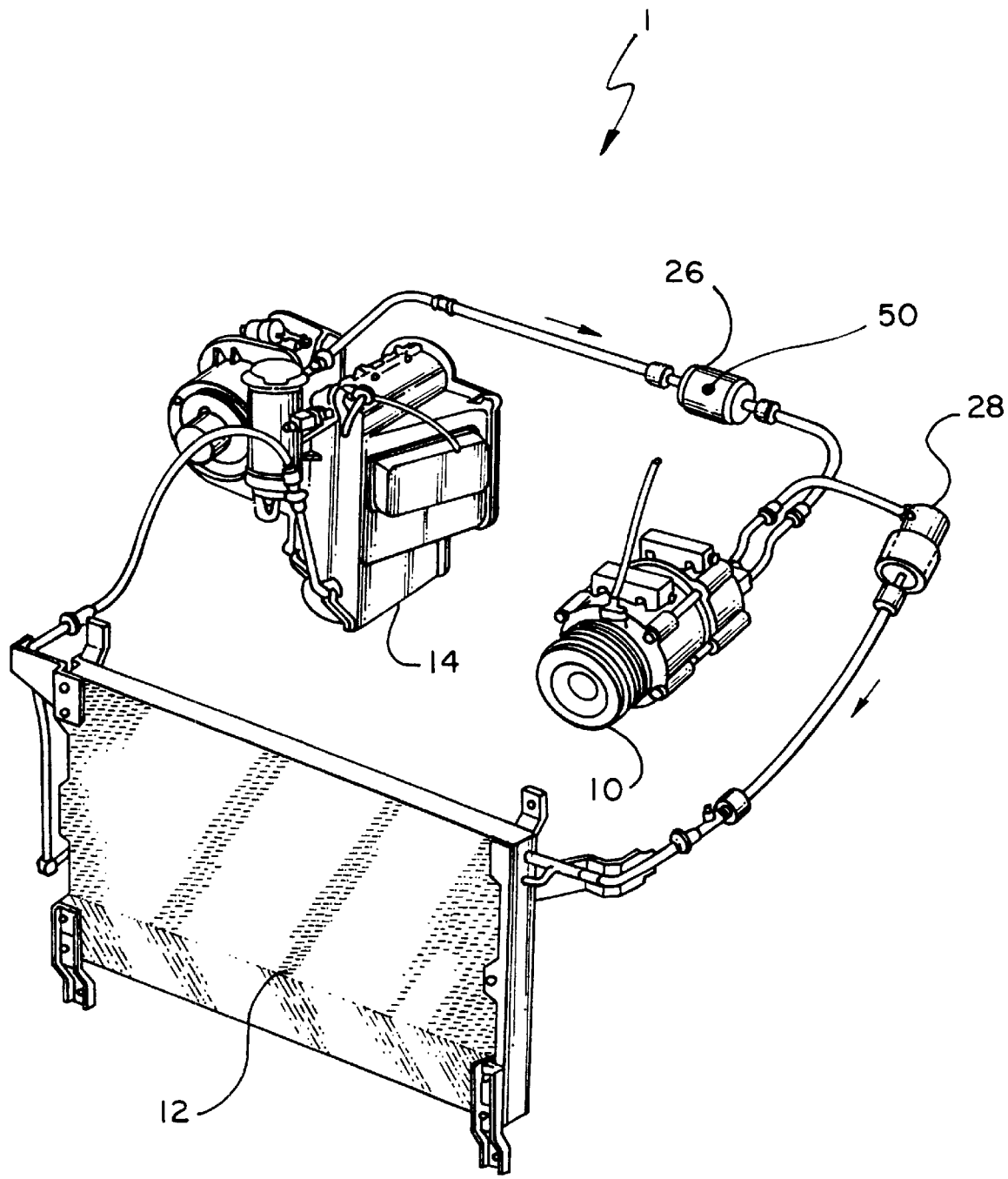
FIG. 11 is a drawing depicting an air conditioning system having a dye-delivery structure in a suction muffler.

Different configurations of air conditioning systems are possible. Referring to FIGS. 1–4, air conditioning system 1 includes expansion valve 16 and receiver drier 18. Receiver drier 18 contains desiccant bag 20. Referring to FIGS. 5–8, air conditioning system 1 includes accumulator 22, which contains desiccant bag 20, and orifice tube 24. Referring to FIGS. 9–11, air conditioning system 1 includes suction muffler 26 and discharge muffler 28.

Figure 2:
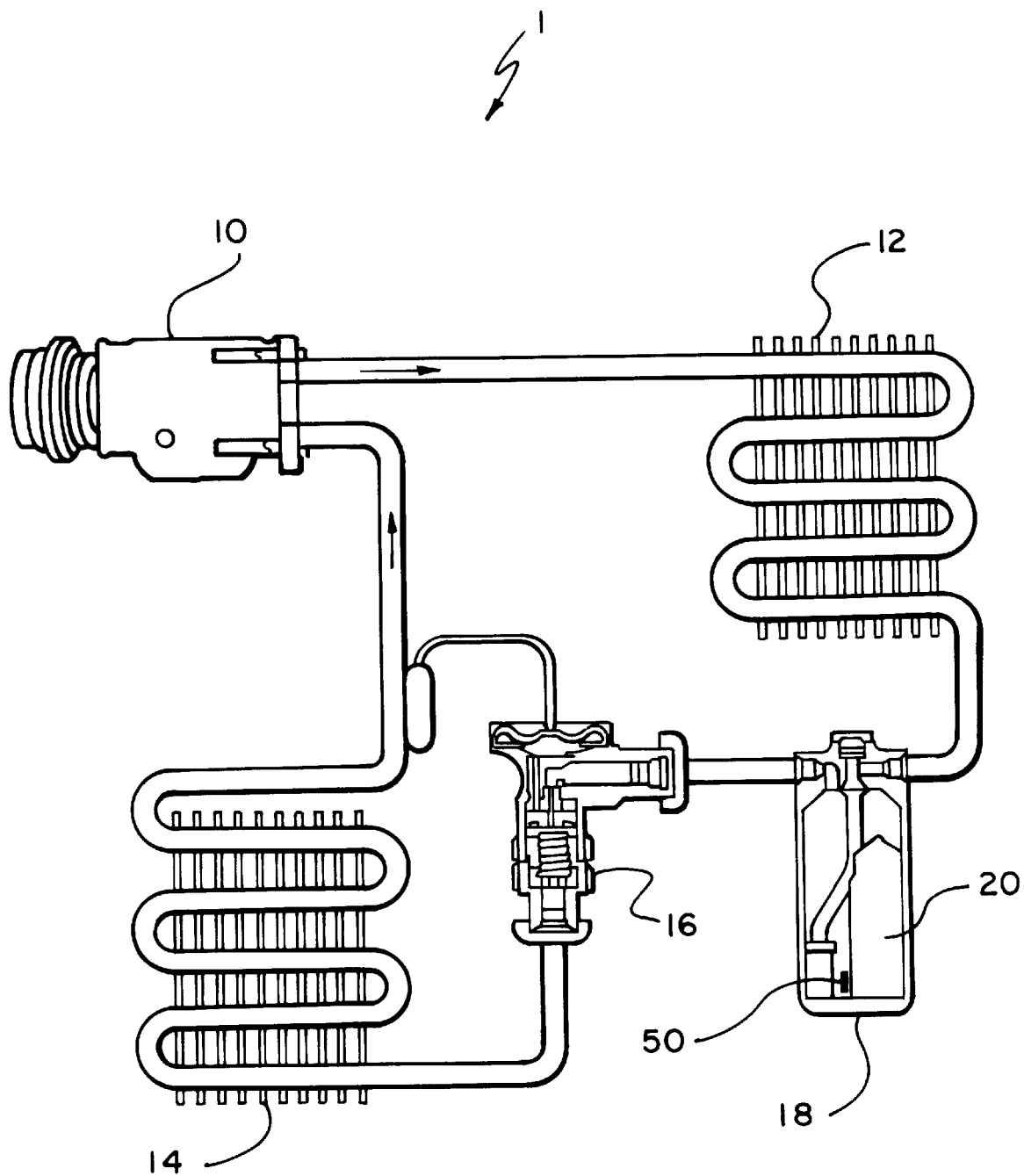
FIG. 2 is a drawing depicting an air conditioning system having a dye-delivery structure in a receiver drier.
Figure 3:
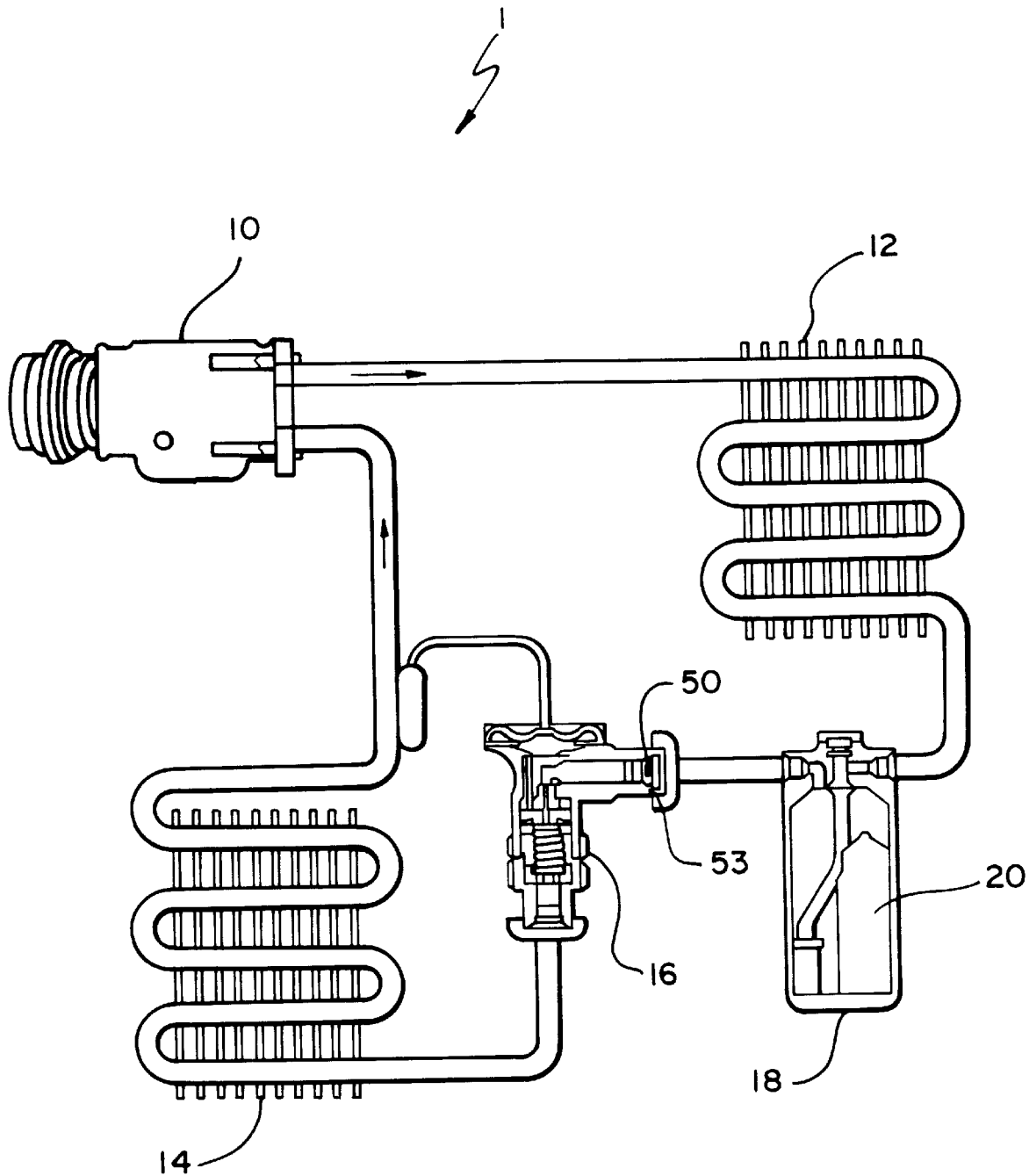
FIG. 3 is a drawing depicting an air conditioning system having a dye-delivery structure in an inlet to an expansion valve.
Figure 4:
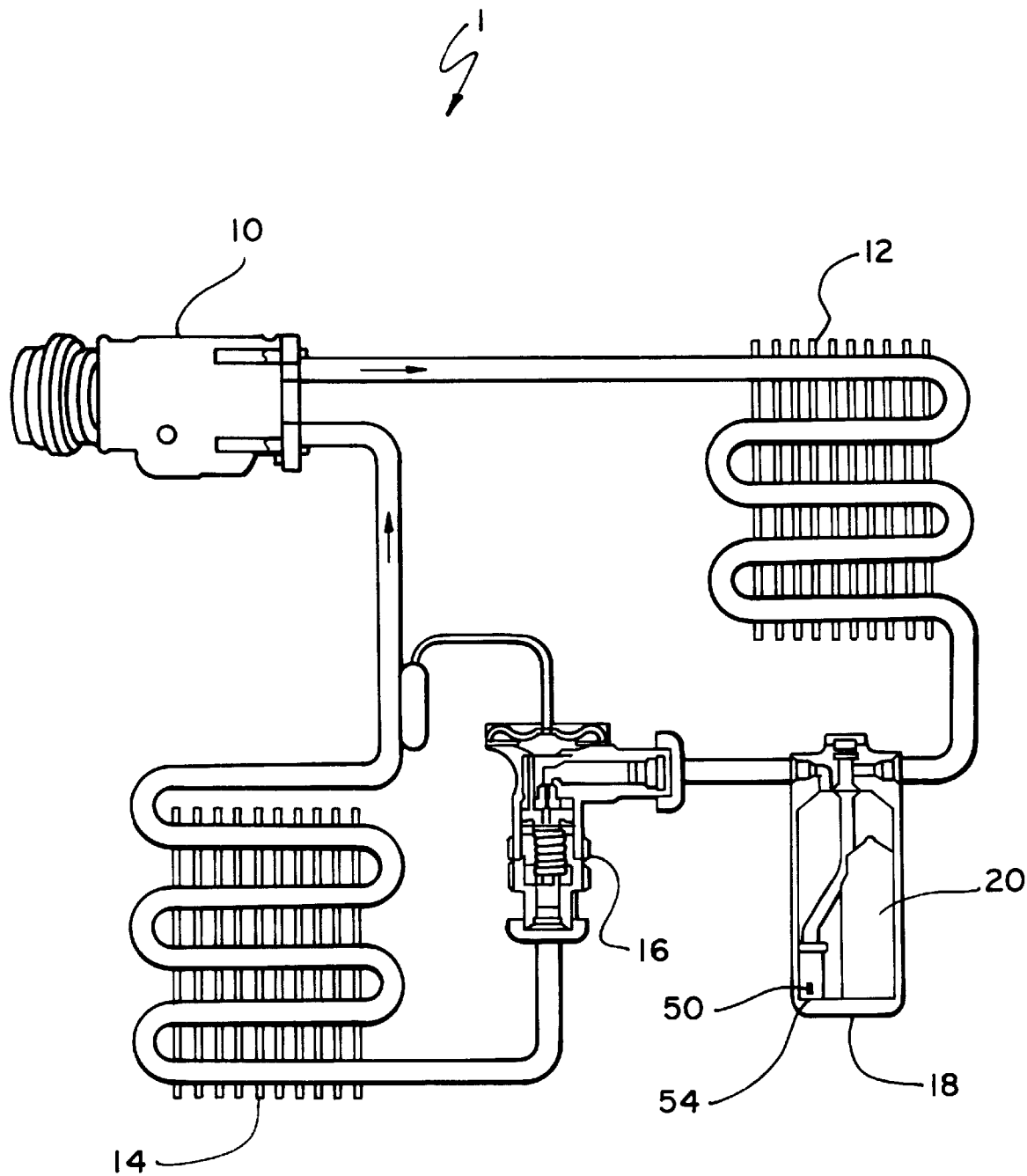
FIG. 4 is a drawing depicting an air conditioning system having a dye-delivery structure in a filter of a receiver drier.
Figure 5:
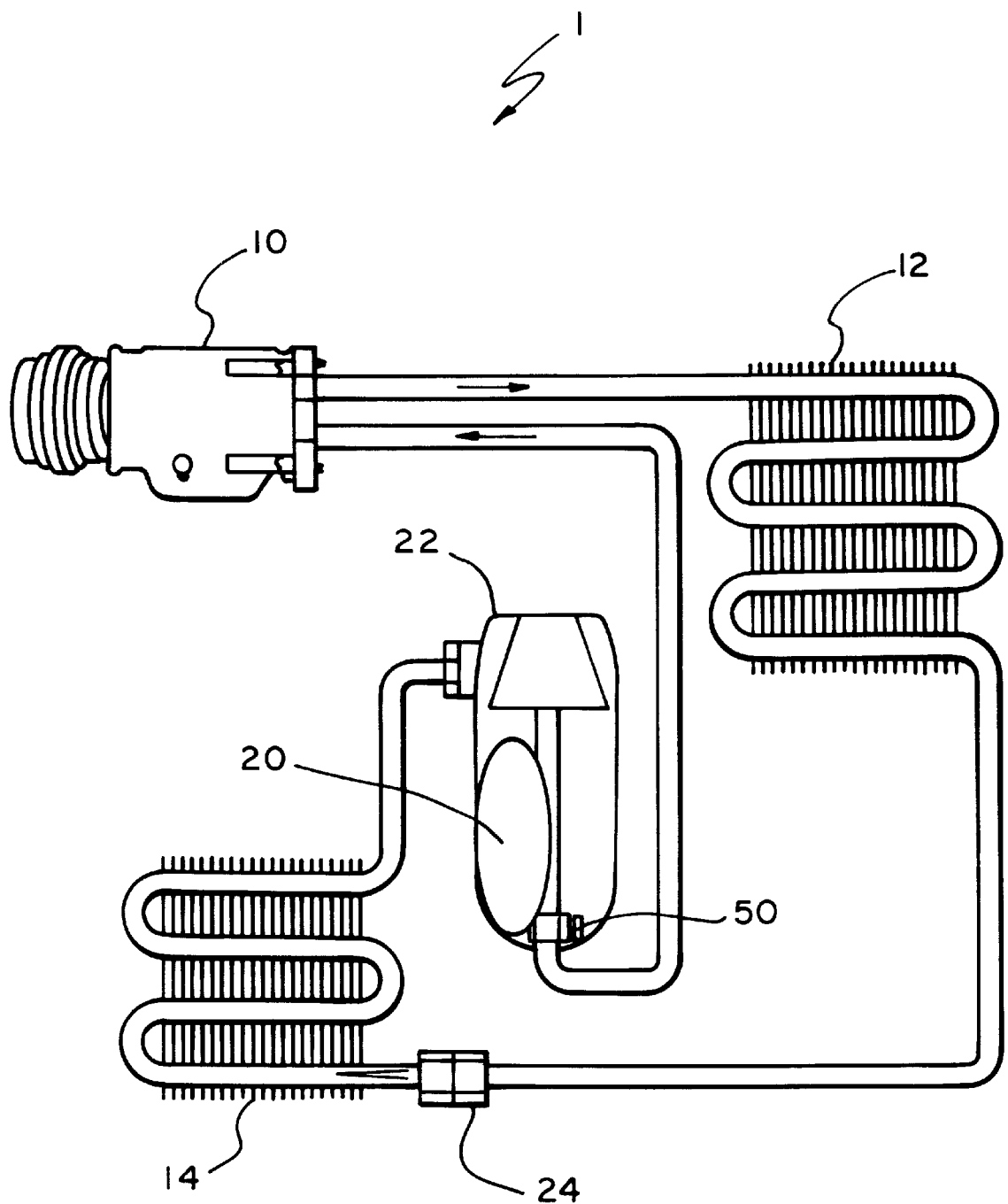
FIG. 5 is a drawing depicting an air conditioning system having a dye-delivery structure in an accumulator.
Figure 6:
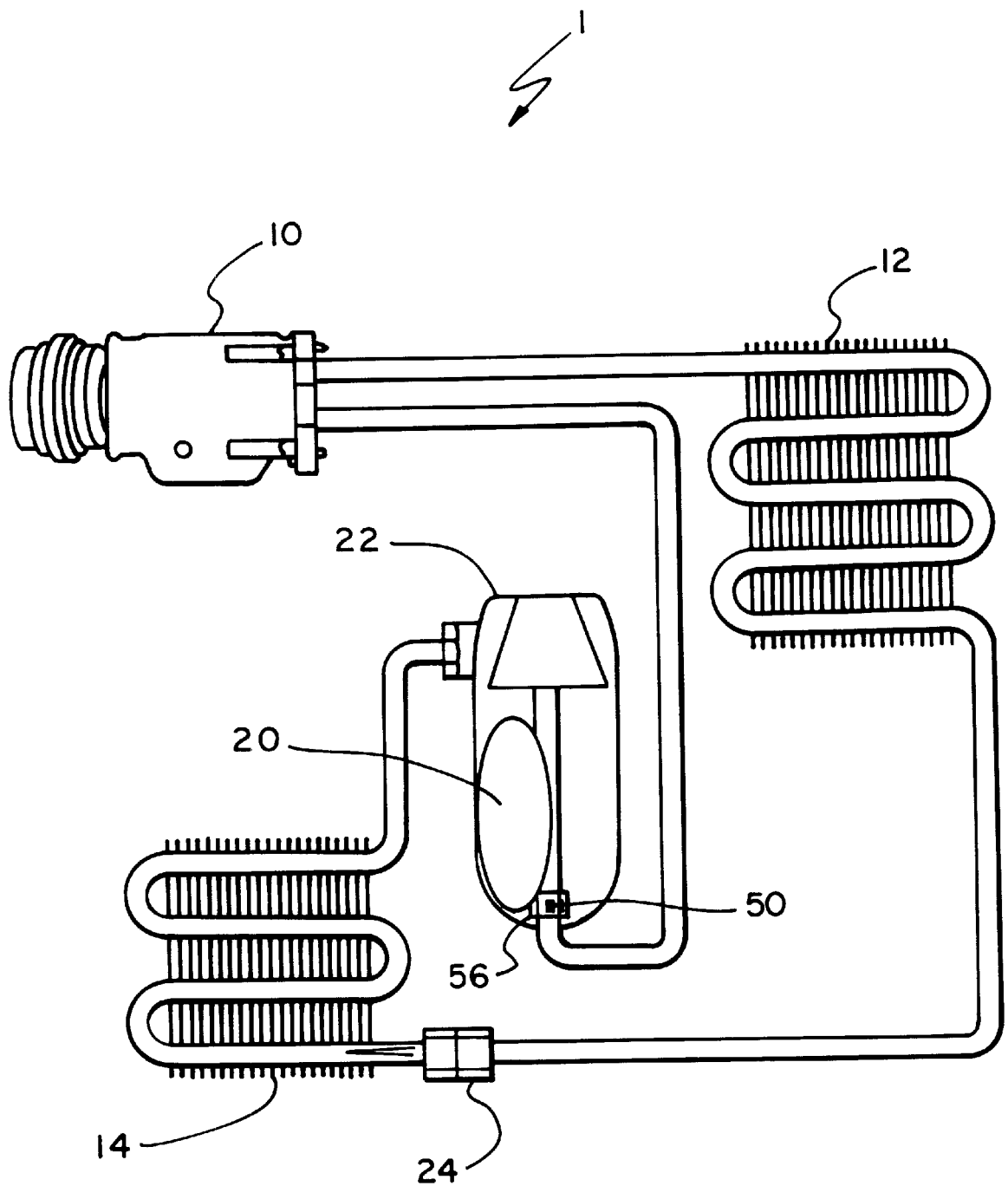
FIG. 6 is a drawing depicting an air conditioning system having a dye-delivery structure in a filter of an accumulator.

The dye-delivery structure can be located in a number of different locations in an air conditioning system. Referring to FIG. 1, dye-delivery structure 50 is located in inlet 52 to compressor 10. Referring to FIG. 2, dye-delivery structure 50 is located in receiver drier 18 external to desiccant bag 20. Referring to FIG. 3, dye-delivery structure 50 is located in inlet 53 to an expansion valve 16. Referring to FIG. 4, dye-delivery structure 50 is located in receiver drier 18 within filter 54. Referring to FIG. 5, dye-delivery structure 50 is located in accumulator 22 external to desiccant bag 20. Referring to FIG. 6, dye-delivery structure 50 is located in accumulator 22 within filter 56. Referring to FIG. 7, dye-delivery structure 50 is located in inlet 58 to evaporator 14. Referring to FIG. 8, dye-delivery structure 50 is in orifice tube 24. Referring to FIG. 9, dye-delivery structure 50 is in inlet 60 to condenser 12. Referring to FIG. 10, dye-delivery structure 50 is in discharge muffler 28. Referring to FIG. 11, dye-delivery structure 50 is in suction muffler 26.

After placing the structure into an air conditioning system, the system is operated to circulate the refrigerant and system lubricant. The circulating refrigerant, system lubricant, or refrigerant-system lubricant mixture dissolves the structure, dispersing the leak detection dye throughout the system. Once dissolved, the dye content of the system can be below about 0.1 percent. After the dye has been allowed to circulate within the system, system components, joints, or attachments can be examined with a light source having a light emission wavelength from 190 nanometers to 700 nanometers. The presence of a leak can be determined by the presence of a colored visual indication, such as fluorescence or other emission, that can be detected after excitation with the light from the light source.

Other embodiments are within the claims. For example, the dye-delivery structure can be formed by extruding a paste to form a pellet. In addition, the structure can be semi-solid, allowing the structure to be deformed when placed into a component of a climate control system, making additional locations within the system accessible for placing the structure.

What is claimed is:

1. A dye-delivery structure comprising:
   a leak detection dye present in a weight percentage of least 90 percent; and
   a binding agent, wherein the leak detection dye and the binding agent are soluble in a refrigerant, a system lubricant, or a refrigerant-system lubricant mixture.

2. The dye-delivery structure of claim 1, wherein the structure includes at least 95 weight percent of the leak detection dye.

3. The dye-delivery structure of claim 1, wherein the structure is solid or semi-solid.

4. The dye-delivery structure of claim 1, wherein the structure includes less than 5 weight percent of the binding agent.

5. The dye-delivery structure of claim 1, wherein the structure further includes a lubricant.

6. The dye-delivery structure of claim 1, wherein the structure further includes a silicone, a phosphate ester, or a lubricant additive.

7. The dye-delivery structure of claim 1, wherein the binding agent comprises a fatty acid, a fatty alcohol, a fatty acid ester, a resin composition, a polyol ester, a polyalkylene glycol, or a hydrocarbon.

8. The dye-delivery structure of claim 1, wherein the binding agent comprises stearic acid, methyl stearate, coconut oil, tricaprin, hydrenol, Lorol(C16), Lorol(C18), cocoa butter, methyl laurate, methyl myristate, coconut fatty acid, or methyl coconate.

9. The dye-delivery structure of claim 1, wherein the leak detection dye comprises a naphthalimide dye, a perylene dye, a thioxanthane dye, a coumarin dye, or a fluorescein dye.

10. The structure of claim 9, wherein the dye comprises a naphthalimide dye.

11. The dye-delivery structure of claim 1, wherein the percent solubility of the dye-delivery structure is greater than 50 percent.

12. The dye-delivery structure of claim 1, wherein the binding agent comprises a polyethylene glycol.

13. A dye-delivery structure comprising a leak detection dye and a binding agent, wherein the percent solubility of the dye-delivery structure is greater than 50 percent and the leak detection dye and the binding agent are soluble in a refrigerant, a system lubricant, or a refrigerant-system lubricant mixture, and the binding agent comprises a fatty acid, a fatty alcohol, a fatty acid ester, a resin composition, a polyol ester, a polyalkylene glycol, or a hydrocarbon.

14. The dye-delivery structure of claim 13, wherein the structure includes at least 90 weight percent of the leak detection dye.

15. The dye-delivery structure of claim 13, wherein the structure includes at least 95 weight percent of the leak detection dye.

16. The dye-delivery structure of claim 13, wherein the structure is solid or semi-solid.

17. The dye-delivery structure of claim 13, wherein the structure includes less than 5 weight percent of the binding agent.

18. The dye-delivery structure of claim 13, wherein the structure further includes a lubricant.

19. The dye-delivery structure of claim 13, wherein the structure further includes a silicone, a phosphate ester, or a lubricant additive.

20. The dye-delivery structure of claim 13, wherein the binding agent comprises stearic acid, methyl stearate, coconut oil, tricaprin, hydrenol, Lorol(C16), Lorol(C18), cocoa butter, methyl laurate, methyl myristate, coconut fatty acid, and methyl coconate.

21. The dye-delivery structure of claim 13, wherein the leak detection dye comprises a naphthalimide dye, a perylene dye, a thioxanthane dye, a coumarin dye, or a fluorescein dye.

22. The structure of claim 20, wherein the dye comprises a naphthalimide dye.

23. A dye-delivery structure consisting essentially of a leak detection dye and a binding agent, wherein the percent solubility of the dye-delivery structure is greater than 50 percent and the leak detection dye and the binding agent are soluble in a refrigerant, a system lubricant, or a refrigerant-system lubricant mixture.

24. A dye-delivery structure consisting essentially of a leak detection dye, a binding agent, and a lubricant, wherein the percent solubility of the dye-delivery structure is greater than 50 percent and the leak detection dye, the binding agent, and the lubricant are soluble in a refrigerant, a system lubricant, or a refrigerant-system lubricant mixture.

25. A dye-delivery structure comprising a solid leak detection dye in a weight percentage of at least 95 percent, wherein the percent solubility of the dye-delivery structure is greater than 50 percent and the solid leak detection dye is soluble in a refrigerant, a system lubricant, or a refrigerant-system lubricant mixture.

26. A method of manufacturing a dye-delivery structure comprising:
   combining a powdered leak detection dye in a weight percentage of at least 90 percent and a binding agent to form a mixture, the leak detection dye and the binding agent being soluble in a non-aqueous refrigerant; and
   pressing the mixture to form a dye-delivery structure.

27. The method of claim 26, wherein the structure includes at least 95 weight percent of the leak detection dye.

28. The method of claim 26, wherein the structure includes less than 10 weight percent of the binding agent.

29. The method of claim 26, wherein the structure includes less than 5 weight percent of the binding agent.

30. The method of claim 26, wherein the structure further includes a lubricant.

31. The method of claim 29, wherein the structure further includes a silicone, a phosphate ester, or a lubricant additive.

32. The method of claim 26, wherein the structure further includes a silicone, a phosphate ester, or a lubricant additive.

33. The method of claim 26, wherein the binding agent comprised a fatty acid, a fatty alcohol, a fatty acid ester, a resin composition, a polyol ester, a polyalkylene glycol, or a hydrocarbon.

34. The method of claim 26, wherein the binding agent comprises stearic acid, methyl stearate, coconut oil, tricaprin, hydrenol, Lorol(C16), Lorol(C18), cocoa butter, methyl laurate, methyl myristate, coconut fatty acid, and methyl coconate.

35. The method of claim 26, wherein the pressing includes compacting the mixture.

36. The method of claim 26, wherein the pressing includes extruding the mixture.

37. The method of claim 25, wherein the dye comprises a naphthalimide dye.

38. A method of introducing a leak detection dye in a climate control system, the method comprising:

placing a dye-delivery structure including a leak detection dye and a binding agent in a component of the climate control system, wherein the hardness of the dye-delivery structure is between about 3 and 15 kg, and the leak detection dye and the binding agent are more than 50% soluble in a lubricant, a refrigerant, or a refrigerant/system-lubricant mixture.

39. The method of claim 38, wherein the climate control system is an air conditioning system.

40. The method of claim 38, wherein the component is a receiver drier, a filter drier, an accumulator, a compressor, a condenser, a high pressure discharge line, a discharge muffler, a suction muffler, an expansion device, an evaporator, or a filter assembly.

41. The dye-delivery structure of claim 38, wherein the leak detection dye comprised a naphthalimide dye, a perylene dye, a thioxanthane dye, a coumarin dye, or a fluorescein dye.

42. The structure of claim 41, wherein the dye comprises a naphthalimide dye.

43. The method of claim 38, further comprising assembling the climate control system including the component after introducing the dye into said component without charging the component with refrigerant at the time of dye insertion.

44. A dye-delivery structure comprising:

a leak detection dye present in a weight percentage of at least 90 percent;

a binding agent, wherein the leak detection dye and the binding agent are soluble in a refrigerant, a system lubricant, or a refrigerant-system lubricant mixture;

a lubricant; and a silicone, a phosphate ester, or a lubricant additive.

45. A dye-delivery structure comprising:

a leak detection dye;

a binding agent, wherein the leak detection dye and the binding agent are soluble in a refrigerant, a system lubricant, or a refrigerant-system lubricant mixture, and the binding agent comprises a fatty acid, a fatty alcohol, a fatty acid ester, a resin composition, a polyol ester, a polyalkylene glycol, or a hydrocarbon;

a lubricant; and a silicone, a phosphate ester, or a lubricant additive.

* * * * *